United States Patent
Miyata et al.

(10) Patent No.: US 10,626,924 B2
(45) Date of Patent: Apr. 21, 2020

(54) CONSTANT VELOCITY UNIVERSAL JOINT

(71) Applicant: NTN CORPORATION, Osaka (JP)

(72) Inventors: Masahide Miyata, Shizuoka (JP); Shin Tomogami, Shizuoka (JP)

(73) Assignee: NTN CORPORATION, Osaka (JP)

( * ) Notice: Subject to any disclaimer, the term of this patent is extended or adjusted under 35 U.S.C. 154(b) by 275 days.

(21) Appl. No.: 15/542,534

(22) PCT Filed: Dec. 14, 2015

(86) PCT No.: PCT/JP2015/084944
§ 371 (c)(1),
(2) Date: Jul. 10, 2017

(87) PCT Pub. No.: WO2016/114049
PCT Pub. Date: Jul. 21, 2016

(65) Prior Publication Data
US 2018/0266492 A1 Sep. 20, 2018

(30) Foreign Application Priority Data

Jan. 13, 2015 (JP) .................................. 2015-004112

(51) Int. Cl.
*F16D 3/226* (2006.01)
*F16D 3/227* (2006.01)
(Continued)

(52) U.S. Cl.
CPC .............. *F16D 3/226* (2013.01); *B60K 17/24* (2013.01); *F16C 3/02* (2013.01); *F16D 3/227* (2013.01);
(Continued)

(58) Field of Classification Search
CPC ...................... F16D 3/226; F16D 3/845; F16D 2003/22309; F16D 2003/2232;
(Continued)

(56) References Cited

U.S. PATENT DOCUMENTS 4,453,395 A * 6/1984 Takeda ................... B21D 53/84
72/714
6,585,601 B2 * 7/2003 Booker ................... F16D 3/227
464/146
(Continued)

FOREIGN PATENT DOCUMENTS

EP 2 105 621 9/2009
JP 8-226454 9/1996
(Continued)

OTHER PUBLICATIONS

International Search Report dated Feb. 23, 2016 in International (PCT) Application No. PCT/JP2015/084944.
(Continued)

*Primary Examiner* — Greg Binda
(74) *Attorney, Agent, or Firm* — Wenderoth, Lind & Ponack, L.L.P.

(57) ABSTRACT

A constant velocity universal joint includes an outer joint member and a joint internal component received in the outer joint member. A shaft is fitted into an inner joint member. The outer joint member has a cup bottom formed on a side opposite to a shaft-fitting side. The cup bottom is configured to regulate movement of the joint internal component toward the side opposite to the shaft-fitting side in a normal state in which an impact generated in an abnormal state is not applied. The cup bottom has a cut portion which is to be cut by the impact generated in the abnormal state involving movement of the joint internal component toward the side opposite to the shaft-fitting side.

14 Claims, 6 Drawing Sheets

(51) Int. Cl.
*B60K 17/24* (2006.01)
*F16C 3/02* (2006.01)
*F16D 3/84* (2006.01)
*F16D 3/223* (2011.01)

(52) U.S. Cl.
CPC ...... *F16D 3/845* (2013.01); *F16D 2003/2232* (2013.01); *F16D 2003/22309* (2013.01); *F16D 2300/12* (2013.01); *Y10S 72/714* (2013.01); *Y10S 464/906* (2013.01)

(58) Field of Classification Search
CPC ........ F16D 2300/12; F16D 3/227; F16C 3/02; Y10S 72/714; Y10S 464/906; B60K 17/24
USPC .................................................. 464/146, 111
See application file for complete search history.

(56) References Cited

U.S. PATENT DOCUMENTS 7,226,360 B2 * 6/2007 Lyon .............................. 464/146
8,167,729 B2 * 5/2012 Frost ............................. 464/146

FOREIGN PATENT DOCUMENTS

| JP | 11-227478 | 8/1999 |
|---|---|---|
| JP | 11-227479 | 8/1999 |
| JP | 2003-146098 | 5/2003 |
| WO | 2008/087824 | 7/2008 |

OTHER PUBLICATIONS

International Preliminary Report on Patentability and Written Opinion of the International Searching Authority dated Jul. 18, 2017 in corresponding International (PCT) Application No. PCT/JP2015/084944.

* cited by examiner

CONSTANT VELOCITY UNIVERSAL JOINT

TECHNICAL FIELD

The present invention relates to a constant velocity universal joint, and more particularly, to a constant velocity universal joint for a propulsion shaft, which serves as a power transmission mechanism, and is to be used for automobiles, various industrial machines, and the like.

BACKGROUND ART

In a four-wheel drive vehicle (4WD vehicle) and a rear-wheel drive vehicle (FR vehicle), a propeller shaft configured to transmit a rotational driving force from a transmission to a differential is used. Further, for the purpose of improving the safety at the time of vehicle collision, there has hitherto been provided a propeller shaft configured to absorb an axial displacement at the time of collision to release an impact force (Patent Literature 1 to Patent Literature 3).

Figure 4:
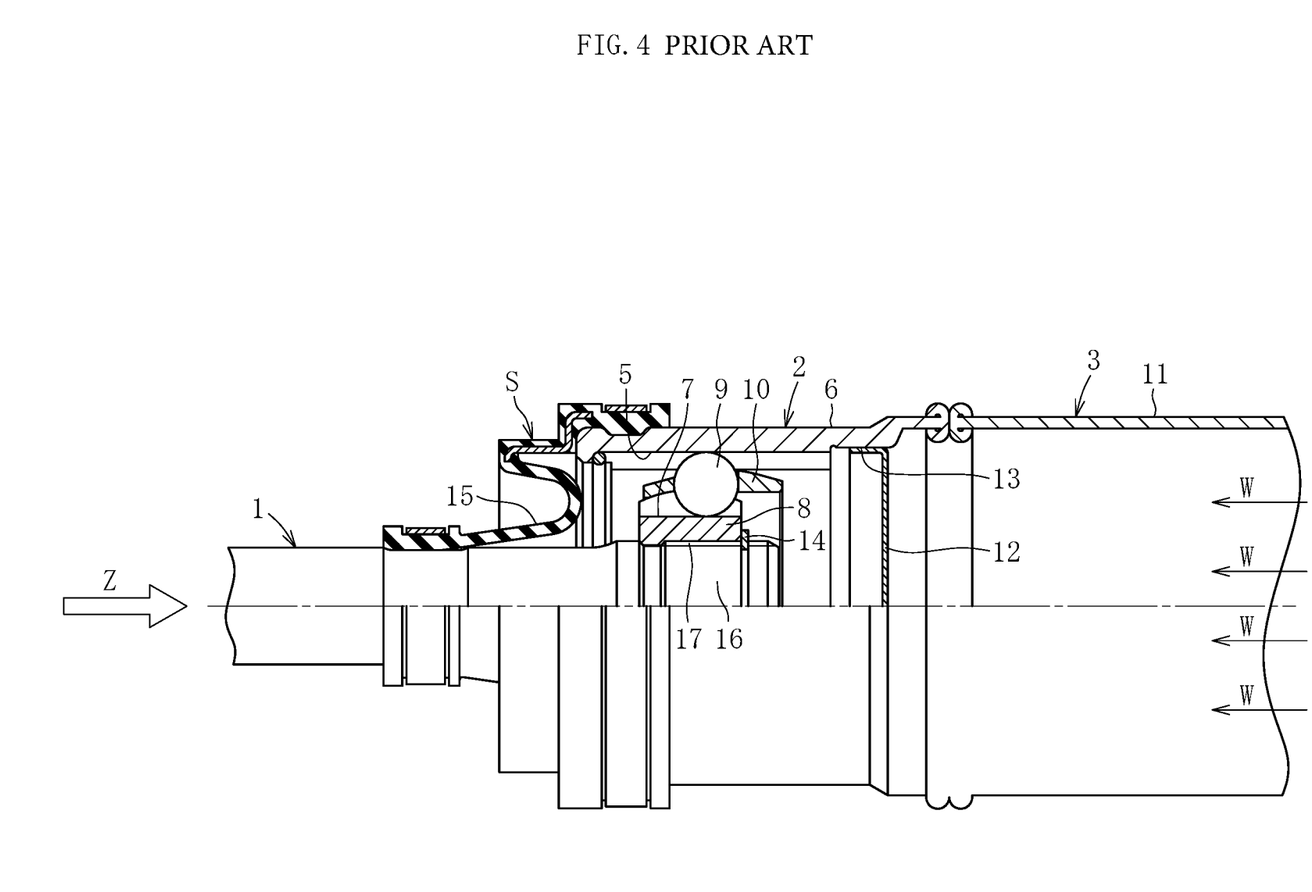
FIG. 4 is a sectional view of a related-art constant velocity universal joint.

As illustrated in FIG. 4, a propeller shaft disclosed in Patent Literature 1 includes a steel pipe shaft 1 and a driven shaft 3. The steel pipe shaft 1 is a driving shaft. The driven shaft 3 is coupled to the steel pipe shaft 1 through intermediation of a constant velocity universal joint 2.

The constant velocity universal joint 2 includes a cylindrical outer joint member 6, an inner joint member 8, a plurality of balls 9, and a cage 10. The outer joint member 6 has track grooves 5 formed in a radially inner surface thereof. The inner joint member 8 has track grooves 7 formed in a radially outer surface thereof. The plurality of balls 9 are interposed between the track grooves 5 of the outer joint member 6 and the track grooves 7 of the inner joint member 8 to transmit torque. The cage 10 is interposed between the radially inner surface of the outer joint member 6 and the radially outer surface of the inner joint member 8 to retain the balls 9.

An end portion of the steel pipe shaft 1 is fitted into the inner joint member 8. In this case, a male serration portion 16 is formed in the end portion of the shaft 1, and a female serration portion 17 is formed in a radially inner surface of the inner joint member 8. The male serration portion 16 and the female serration portion 17 are fitted to each other. Further, a stop ring 14 is mounted to a shaft protruding portion protruding from the inner joint member 8 toward a pipe member 11 side to prevent separation of the shaft 1.

The outer joint member 6 has an opening portion on a side opposite to the shaft side, and is coupled at the opening portion to the pipe member 11 provided adjacent to the outer joint member 6. A seal plate 12 is fitted on the opening portion side. Specifically, an annular step portion 13 is formed on the opening portion side, which is the side opposite to the shaft side, of the outer joint member 6, and the seal plate 12 is press-fitted and fixed to the step portion 13. Further, an opening portion of the outer joint member 6 on the shaft side is closed by a sealing structure S having a rubber boot 15.

Figure 5:
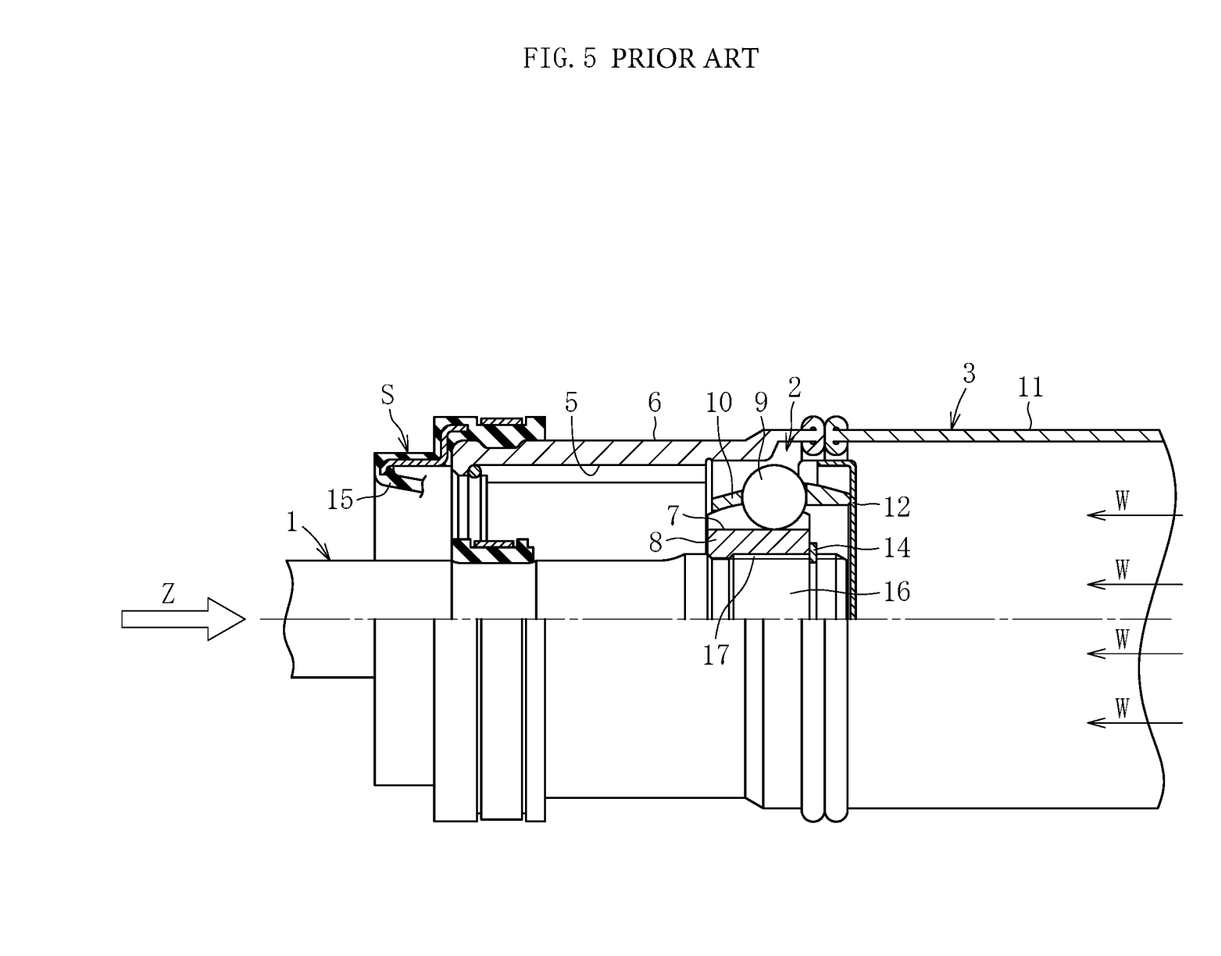
FIG. 5 is a sectional view for illustrating a state in which an impact load is applied to the constant velocity universal joint illustrated in FIG. 4 to cause a joint internal component and a seal ring to pass through press-contact curled portions.
Figure 6:
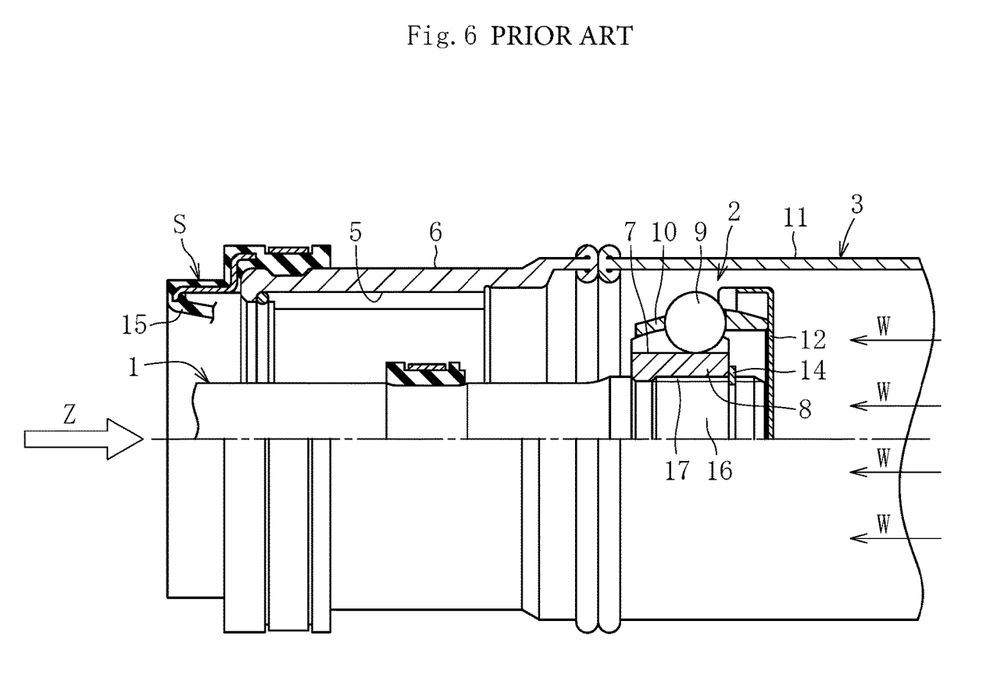
FIG. 6 is a sectional view for illustrating a state in which an impact load is applied to the constant velocity universal joint illustrated in FIG. 4 to cause the joint internal component and the seal ring to enter a steel pipe shaft.

At the time of collision of a vehicle or other accidents, when an impact load Z acts in an axial direction from the transmission side, a reverse reaction force W acts on the driven shaft 3 as a reaction to the impact load Z. The reaction causes an internal component (unit body including the inner joint member 8, the balls 9, and the cage 10) of the constant velocity universal joint to slide relative to the pipe member (companion flange) 11 toward the pipe member 11 side. As illustrated in FIG. 5, the rubber boot 15 is broken, and the internal component presses the seal plate 12 toward the pipe member 11 side. As a result, the seal plate 12 is separated from the step portion 13. With this action, the impact is once absorbed. Then, as illustrated in FIG. 6, further movement of the internal component of the constant velocity universal joint toward the pipe member 11 side is allowed, thereby being capable of absorbing the impact.

According to Patent Literature 2, a seal plate integrally including a metal core and rubber is provided. At the time of impact, the metal core is separated from the rubber at a rim portion so that the seal plate is allowed to enter the companion flange together with a joint internal component (component including an inner joint member, a cage, and balls).

According to Patent Literature 3, a seal plate integrally including a metal core and rubber is provided, and a through hole is formed at a center portion of the metal core. At the time of impact, the shaft breaks through the rubber and is allowed to enter a companion flange through the through hole of the metal core.

With regard to the related art, the following problem in terms of safety is conceivable. That is, the propeller shaft protrudes at the time of collision of the vehicle, with the result that a significant impact force may act on the vehicle, or the pipe portion may be buckled into a V-shape to enter a vehicle cabin. Therefore, in order to absorb the axial displacement which may occur at the time of collision, there has been proposed a mechanism which allows the internal member of the constant velocity joint to enter a hollow portion of the companion flange or the pipe portion.

CITATION LIST

Patent Literature 1: JP 2003-146098 A
Patent Literature 2: JP 11-227478 A
Patent Literature 3: JP 11-227479 A

SUMMARY OF INVENTION

Technical Problem

According to the related art of Patent Literature 1 to Patent Literature 3, the seal plate having a grease-retaining function is press-fitted to the constant velocity universal joint having a slide mechanism. When an impact load is generated, the seal plate is separated, or the shaft breaks through the rubber member of the seal plate. As a result, the internal member (joint internal component) of the constant velocity universal joint or the shaft enters the companion flange so that the axial displacement is absorbed. Further, according to the related art, in order to receive an axial load which may be generated at the time of normal traveling or at the time of handling, the stop ring is mounted to a cup bottom portion.

The following manufacturing steps are performed for the above-mentioned related art, and the cost is increased. That is, steps of processing the outer joint member includes hot forging, turning, broaching of a track portion, and heat treatment in the stated order. Further, components such as the seal plate and the stop ring are required, with the result that cost for the supply of those components is required. Moreover, an operation of press-fitting the seal plate to the outer joint member and an operation of mounting the stop ring are required, with the result that assembly workability is degraded.

In view of the above, the present invention provides a constant velocity universal joint which is capable of absorbing the axial displacement at the time of application of an impact load, and is also capable of reducing the number of assembly steps to achieve excellent assembly workability.

Solution to Problem

According to one embodiment of the present invention, there is provided a constant velocity universal joint, comprising: an outer joint member; a joint internal component received in the outer joint member; and an inner joint member into which a shaft is fitted, wherein the outer joint member has a cup bottom formed on a side opposite to a shaft-fitting side of the outer joint member, wherein the cup bottom is configured to close an opening portion of the outer joint member on the side opposite to the shaft-fitting side, and is configured to regulate movement of the joint internal component toward the side opposite to the shaft-fitting side in a normal state in which an impact generated in an abnormal state is not applied, and wherein the cup bottom has a cut portion which is to be cut by the impact generated in the abnormal state involving movement of the joint internal component toward the side opposite to the shaft-fitting side.

According to one embodiment of the constant velocity universal joint of the present invention, when the impact force is applied to the shaft at the time of vehicle collision or other accidents, movement of the joint internal component toward the side opposite to the shaft-fitting side causes the cup bottom to be cut at the cut portion so that the cup bottom can be moved together with the joint internal component toward the side opposite to the shaft-fitting side. Further, under the normal state in which the impact generated in the abnormal state is not applied, the movement of the joint internal component toward the side opposite to the shaft-fitting side is regulated. Further, the cup bottom is configured to close the opening portion on the side opposite to the shaft-fitting side. Therefore, the cup bottom exerts the function of the related-art seal plate. Further, there is no need to mount the cup bottom through the press-fitting operation which is performed for the seal plate. Further, in the normal state, the movement of the joint internal component toward the side opposite to the shaft-fitting side is regulated. Therefore, there is no need to provide the stop ring configured to regulate the movement.

It is preferred that a steel pipe shaft be coupled to the outer joint member on the side opposite to the shaft-fitting side, that the cut portion be formed on a radially outer side with respect to a maximum outer diameter of the joint internal component, and that, at the time of application of the impact in the abnormal state, the cup bottom cut at the cut portion and the joint internal component be allowed to enter the steel pipe shaft.

The cut portion is formed on the radially outer side with respect to the maximum outer diameter of the joint internal component. Therefore, when the cup bottom is cut at the time of application of the impact in the abnormal state, the cup bottom and the joint internal component can enter the steel pipe shaft without contact or collision with other parts.

It is preferred that the outer joint member have track grooves finished by cold forging in a radially inner surface of the outer joint member. Further, it is preferred that the cut portion of the cup bottom be finished by machining, or be formed through adjustment of a heat treatment range.

Advantageous Effects of Invention

According to the present invention, when the impact force is applied to the shaft at the time of vehicle collision or other accidents, the joint internal component can be moved to the side opposite to the shaft-fitting side, thereby being capable of absorbing the axial displacement when the impact load is generated. Further, there is no need to provide the seal plate and the stop ring having been required for the related art, thereby being capable of reducing the number of components. Therefore, the cost can be reduced, and the operation of press-fitting the seal plate and the operation of mounting the stop ring can be omitted, thereby being capable of improving the assembly workability.

The cut portion is formed on the radially outer side with respect to the maximum outer diameter of the joint internal component. Therefore, the cup bottom and the joint internal component can enter the steel pipe shaft without contact or collision with other parts, thereby stabilizing the impact-absorbing function.

When the outer joint member has track grooves finished by cold forging in a radially inner surface of the outer joint member, there is no need to perform broaching of the track grooves, which has been performed after hot forging, thereby being capable of improving the productivity. Further, when the cut portion of the cup bottom is finished by machining, the cutting strength of the cut portion can easily be set and may be set in accordance with a part to be used, thereby achieving excellent designability. Further, when the cut portion of the cup bottom is formed through adjustment of the heat treatment range, both the processability and the cutting strength of the cut portion can be adjusted. For example, the processability can be secured by expanding the non-heat treatment portion.

DESCRIPTION OF EMBODIMENTS

Now, an embodiment of the present invention is described with reference to FIG. 1 to FIG. 3.

A constant velocity universal joint mainly comprises an inner joint member 51, an outer joint member 52, balls 53, and a cage 54. That is, the constant velocity universal joint according to this embodiment is a plunging type constant velocity universal joint (double-offset type) using the balls 53 for transmission of torque.

The inner joint member 51 has a plurality of track grooves 56 formed in an outer peripheral surface (convex spherical outer peripheral surface) thereof. A shaft 58 is inserted to a center hole of the inner joint member 51 to be spline-fitted, that is, coupled at serration portions. Specifically, a female serration portion 55 is formed in a radially inner surface of the inner joint member 51, and a male serration portion 60 is formed in an end portion of the shaft 58. When the end portion of the shaft 58 is fitted into the center hole of the inner joint member 51, the male serration portion 60 formed in the end portion of the shaft 58 and the female serration portion 55 formed in the inner joint member 51 are fitted to each other, that is, coupled at the serration portions.

A circumferential recess groove 48 is formed in an end portion of the male serration portion 60 of the shaft 58, and a stop ring 49 is fitted to the circumferential recess groove 48. Thus, separation of the shaft 58 from the inner joint member 51 in the direction indicated by the arrow B is regulated. Further, an end portion of the female serration portion 55 of the inner joint member 51, that is, an end portion on a side opposite to a cup bottom 63 described later, and a corresponding end portion of the male serration portion 60 are fitted to each other to regulate separation of the shaft 58 from the inner joint member 51 in the direction indicated by the arrow A.

The outer joint member 52 has track grooves 57 in an inner peripheral surface (cylindrical inner peripheral surface) thereof. The number of the track grooves 57 is equal to the number of the track grooves 56 of the inner joint member 51. The plurality of balls 53 configured to transmit torque are interposed between the track grooves 57 of the outer joint member 52 and the track grooves 56 of the inner joint member 51. The cage 54 is arranged between the inner joint member 51 and the outer joint member 52, and the balls 53 are retained in pockets 59 of the cage 54. The inner joint member 51, the cage 54, and the balls 53 construct a joint internal component 100 received in the outer joint member 52. Further, a steel pipe shaft 40 is coupled to the outer joint member 52.

Figure 2:
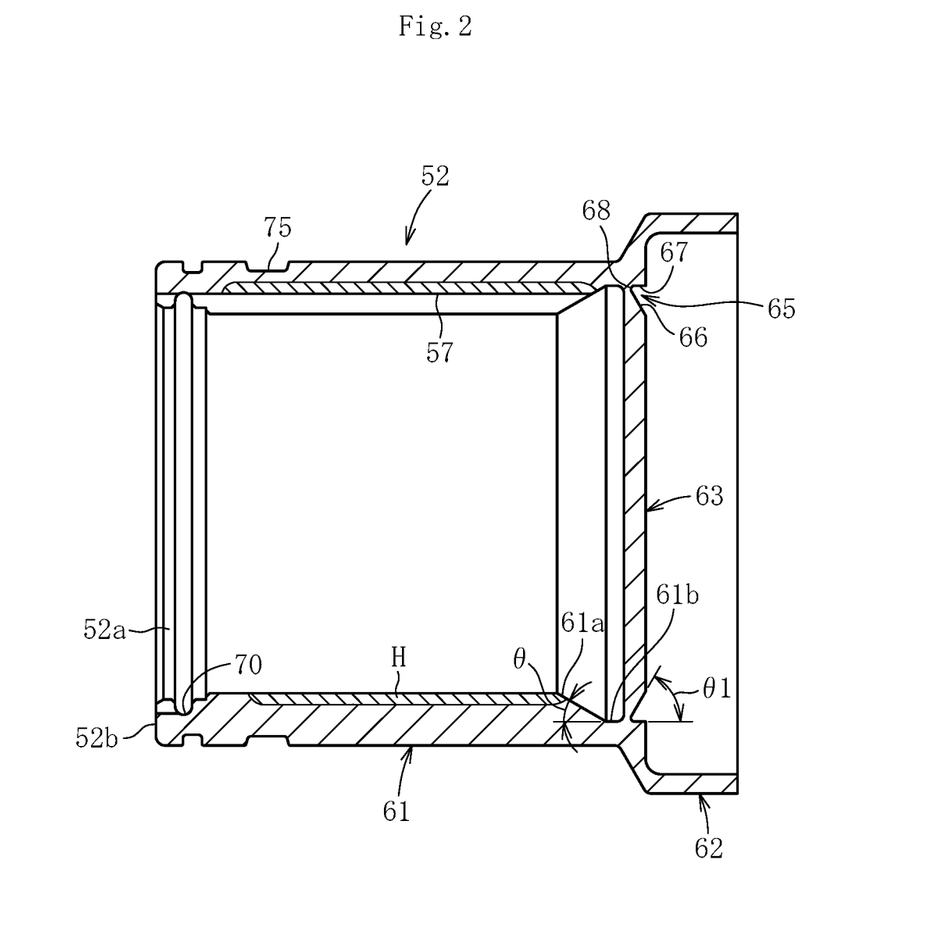
FIG. 2 is a sectional view of an outer joint member of the constant velocity universal joint of FIG. 1.

As illustrated in FIG. 2, the outer joint member 52 comprises a main body cylindrical portion 61, a large-diameter coupling ring portion 62, and the cup bottom 63. The main body cylindrical portion 61 has the track grooves 57 formed in the inner peripheral surface (cylindrical inner peripheral surface) thereof. The large-diameter coupling ring portion 62 is formed on the steel pipe shaft side of the main body cylindrical portion 61. The cup bottom 63 is formed between the main body cylindrical portion 61 and the large-diameter coupling ring portion 62. The cup bottom 63 closes the opening portion on the side opposite to the shaft-fitting side (steel pipe shaft side).

On the cup bottom 63 side of the main body cylindrical portion 61, there are formed a tapered recess portion 61a, which is increased in diameter toward the cup bottom 63, and a short cylindrical surface portion 61b. Further, the cup bottom 63 is formed of a disc member and has a circumferential notch portion 65 at a radially outer portion on the steel pipe shaft side. The circumferential notch portion 65 comprises a right-triangle sectional shape portion having a tapered surface 66 and a cylindrical surface 67. The tapered surface 66 is inclined toward a joint inner side (shaft-fitting side) as approaching from a radially inner side to the radially outer side. The cylindrical surface 67 is formed on the radially outer side. Accordingly, a thin coupling portion is formed between the circumferential notch portion 65 and the short cylindrical surface portion 61b, and the coupling portion constructs a cut portion 68 of the cup bottom 63.

Further, a stop ring 69 configured to prevent separation of the joint internal component 100 from the opening portion 52a is mounted to the radially inner surface of the outer joint member on the opening portion 52a side, which is formed on the shaft-fitting side. That is, a circumferential groove 70 is formed in the opening portion radially inner surface of the outer joint member 52, and the stop ring 69 is fitted to the circumferential groove 70. As illustrated in FIG. 2, a thermally-hardened portion H hardened by thermal hardening treatment such as induction hardening is formed on the radially inner surface and the track grooves 57 of the outer joint member 52.

The opening portion 52a of the outer joint member 52 is closed by a sealing structure 73 comprising a boot 71 and a boot adaptor 72. That is, the boot adaptor 72 has a large-diameter portion 72a which is externally fitted and fixed to the opening portion 52a of the outer joint member 52 on the shaft-fitting side, and the boot 71 has a small-diameter portion 71b mounted to a boot-mounting portion 58b of the shaft 58 with a boot band 74. Further, a large-diameter portion 71a of the boot 71 is caulked and fixed to an opening end portion 72b of the boot adaptor 72. A circumferential recess groove 75 is formed in the radially outer surface of the outer joint member 52 on the opening portion 52a side, and an end reduced-diameter portion 76 of the large-diameter portion 72a of the boot adaptor 72 is fitted into the recess groove 75. Further, a sealing member 77 is mounted between the recess groove 75 and the opening end surface 52c.

Incidentally, the steel pipe shaft 40 is coupled to the outer joint member 52. In this case, a cylindrical portion 40a of the steel pipe shaft 40 is joined to the large-diameter coupling ring portion 62 of the outer joint member 52. The joining is performed through friction joining. The friction joining is a technique of rubbing members to be joined (metal or ceramics) with high-speed rotation, melting or softening the members with a friction heat generated at the time of rubbing with high-speed rotation, and thereafter applying a pressure to join the members. Therefore, at a joined portion 80, there are formed radially inner curled portions 80a and radially outer curled portions 80b.

Each of the large-diameter coupling ring portion 62 of the outer joint member 52 and the cylindrical portion 40a has a diameter larger than that of the main body cylindrical portion 61 of the outer joint member 52. The radially inner curled portions 80a are arranged on a radially outer side with respect to the cut portion 68 of the cup bottom 63 and the maximum outer diameter of the joint internal component 100. Further, the cut portion 68 of the cup bottom 63 is arranged on the radially outer side with respect to the maximum outer diameter of the joint internal component 100.

Incidentally, the cut portion 68 can be obtained by forming the tapered recess portion 61a and the circumferential notch portion 65 through turning. Therefore, the outer joint member 52 can be formed through only cold forging, turning, and heat treatment.

Figure 1:
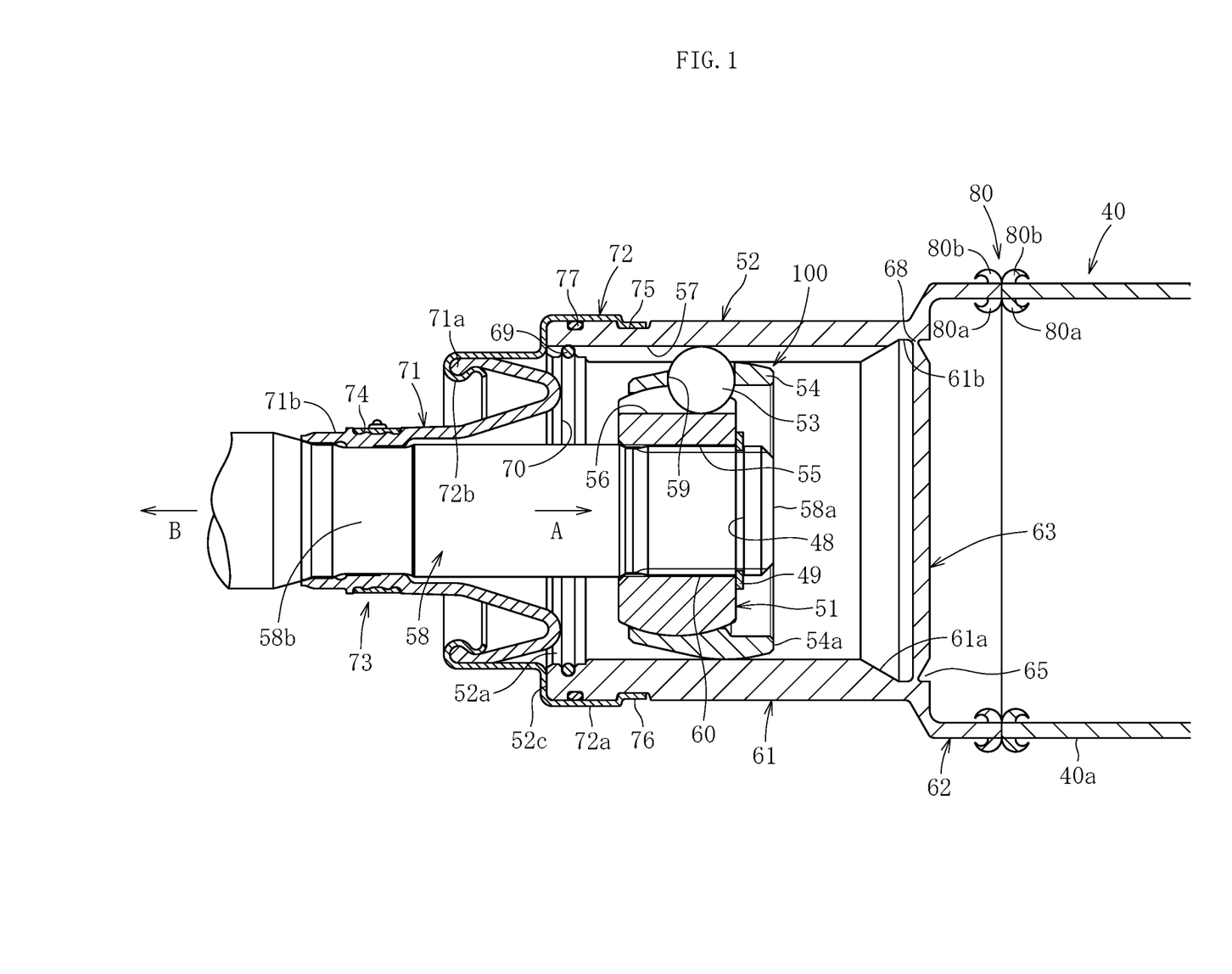
FIG. 1 is a sectional view of a constant velocity universal joint according to the present invention.

With the constant velocity universal joint having such a configuration, the joint internal component 100 can slide in the direction indicated by the arrow A with respect to the outer joint member 52 from the state illustrated in FIG. 1. Even when the sliding causes an end of the joint internal component 100, that is, an end surface 58a of the shaft 58 or an end surface 54a of the cage 54 to be brought into abutment against the cup bottom 63 in the normal state of use, the cup bottom 63 can regulate movement of the joint internal component 100 in the direction indicated by the arrow A. That is, the strength of the cut portion 68 of the cup bottom 63 is set so that the cut portion 68 is not cut even when the cup bottom 63 is pushed by the joint internal component 100 in the direction indicated by the arrow A with an external force applied in the normal state of use.

Figure 3:
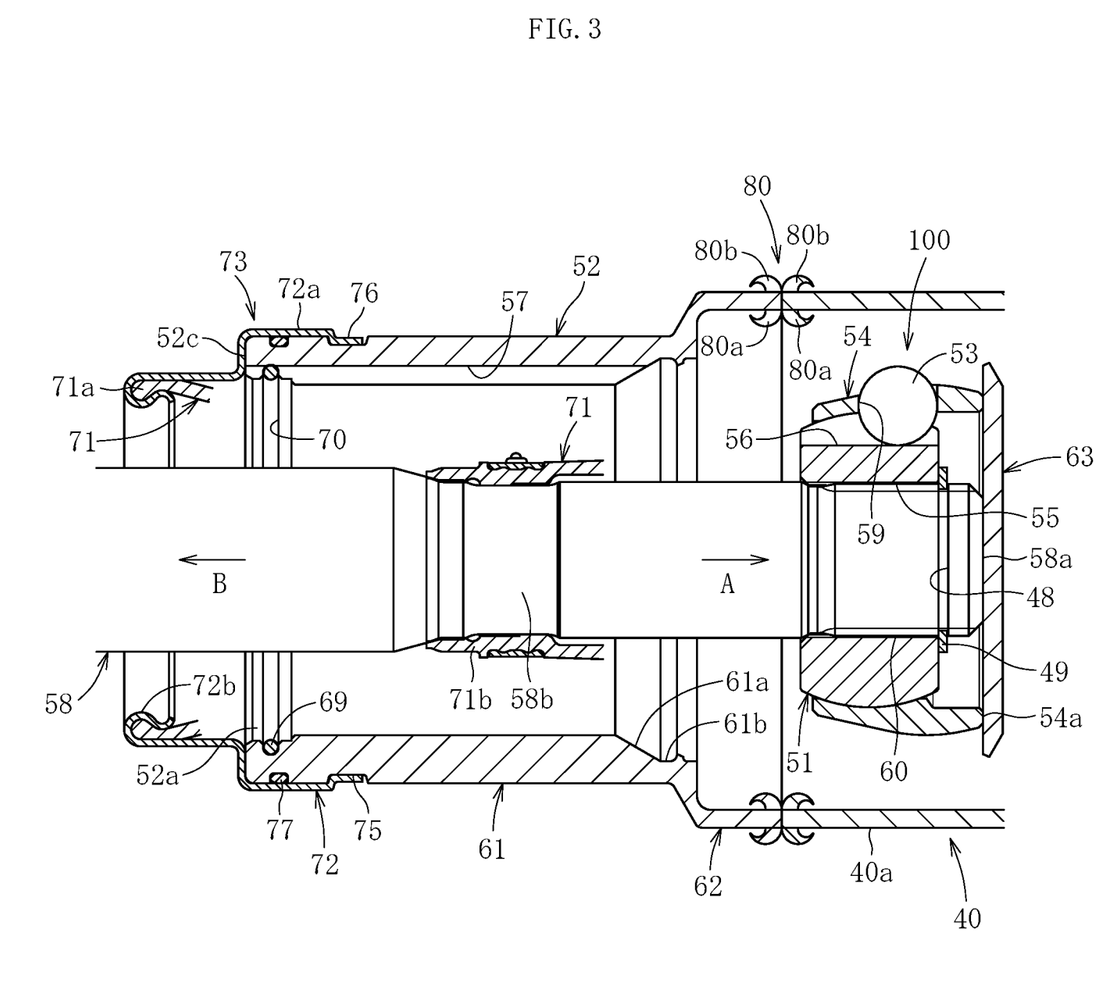
FIG. 3 is a sectional view for illustrating a state in which an impact load is applied to the constant velocity universal joint of FIG. 1.

However, when an impact force is applied to the shaft 58 at the time of vehicle collision or other accidents, and the joint internal component 100 is moved in the direction indicated by the arrow A, that is, toward the side opposite to the shaft-fitting side, as illustrated in FIG. 3, the boot 71 is broken, and the cut portion 68 of the cup bottom 63 is cut. As a result, the joint internal component 100 and the cup bottom 63 separated from the outer joint member 52 enter the cylindrical portion 40*a* of the steel pipe shaft 40.

Therefore, the axial displacement can be absorbed when the impact load is generated. In this case, the radially inner curled portions 80*a* are arranged on the radially outer side with respect to the cut portion 68 of the cup bottom 63 and the maximum outer diameter of the joint internal component 100. At the time of entry of the joint internal component 100 and the cup bottom 63 into the cylindrical portion 40*a* of the steel pipe shaft 40, the joint internal component 100 and the cup bottom 63 are prevented from being brought into contact with or colliding with the radially inner curled portions 80*a*. Accordingly, the absorbing function is stabilized.

According to the present invention, when an impact force is applied to the shaft 58 at the time of vehicle collision or other accidents, the joint internal component 100 can be moved toward the side opposite to the shaft-fitting side, and the axial displacement can be absorbed when an impact load is generated. Further, there is no need to provide the seal plate and the stop ring having been required for the related art, thereby being capable of reducing the number of components. Therefore, the cost can be reduced, and the operation of press-fitting the seal plate and the operation of mounting the stop ring can be omitted, thereby being capable of improving the assembly workability.

The cut portion 68 is formed on the radially outer side with respect to the maximum outer diameter of the joint internal component 100. Therefore, the cup bottom 63 and the joint internal component 100 can enter the steel pipe shaft 40 without contact or collision with other parts, thereby stabilizing the impact-absorbing function.

When the track grooves 57 in the radially inner surface of the outer joint member 52 are formed by cold forging, there is no need to perform broaching of the track grooves 57, which has been performed after hot forging, thereby being capable of improving the productivity. Further, when the cut portion 68 of the cup bottom 63 is finished by machining, the cutting strength of the cut portion 68 can easily be set and may be set in accordance with a part to be used, thereby achieving excellent designability.

Through adjustment of the heat treatment range, both the processability and the cutting strength of the cut portion 68 can be adjusted. For example, the processability can be secured by expanding the non-heat treatment portion.

Incidentally, the constant velocity universal joint of the double-offset type (DOJ) is described in the above-mentioned embodiment. However, the constant velocity universal joint may be of a plunging type such as a tripod type (TJ) or a cross-groove type (LJ), or of a fixed type such as a Barfield type (BJ) or an undercut-free type (UJ).

The tripod type (TJ) corresponds to a plunging type constant velocity universal joint comprising an outer joint member having three track grooves each having roller guide surfaces opposed to each other in a circumferential direction, a tripod member having three leg shafts protruding in a radial direction of the tripod member, and rollers externally fitted to the leg shafts through intermediation of rollers in a rotatable manner.

In the cross-groove type (LJ), tracks of an inner race and tracks of an outer race are angled in opposite directions with respect to an axis, and a ball is interposed at an intersection between each pair of a track of the inner race and a track of the outer race.

The Barfield-type (BJ) corresponds to a fixed type constant velocity universal joint in which each groove bottom of track grooves is formed only of an arc portion. The undercut-free type (UJ) corresponds to a fixed type constant velocity universal joint in which each groove bottom of track grooves is formed of an arc portion and a straight portion.

The embodiment of the present invention is described above. However, the present invention is not limited to the above-mentioned embodiment, and various modifications may be made. When the cut portion 68 is to be formed, various changes may be made for an inclination angle θ of the tapered recess portion 61*a* on the main body cylindrical portion 61 side of the outer joint member 52, an inclination angle θ1 of the circumferential notch portion 65, a thickness dimension of the cut portion 68, and the like in accordance with a material, a set external force bearing property with respect to an impact, and the like of the outer joint member 52 and the cup bottom 63.

When the cut portion 68 is to be formed, the circumferential notch portion 65 in the above-mentioned embodiment is formed of the right-triangle sectional shape portion. However, the sectional shape is not limited to the right triangle and may be an isosceles triangle, an equilateral triangle, an arc shape, an elliptical shape, a rectangular shape, or the like. The circumferential notch portion 65 is formed on the steel pipe shaft side. However, such a circumferential notch portion (circumferential groove) may be formed on a joint side (side opposite to the steel pipe shaft side). Further, the circumferential notch portion may be formed on the steel pipe shaft side and on the side opposite to the steel pipe shaft side.

INDUSTRIAL APPLICABILITY

The constant velocity universal joint according to this embodiment may be used in a constant velocity universal joint for a propulsion shaft serving as a power transmission mechanism to be used for automobiles, various industrial machines, and the like. The constant velocity universal joint may be of the plunging type such as the double-offset type (DOJ), the tripod type (TJ), or the cross-groove type (LJ), or of the fixed type such as the Barfield type (BJ) or the undercut-free type (UJ).

REFERENCE SIGNS LIST

40 steel pipe shaft
51 inner joint member
52 outer joint member
58 shaft
63 cup bottom
68 cut portion
100 joint internal component

The invention claimed is:

1. A constant velocity universal joint comprising:
   an outer joint member; and
   a joint internal component received in the outer joint member and into which a shaft is fitted,
   wherein the outer joint member has a cup bottom formed on a side opposite to a shaft-fitting side of the outer joint member at a cut portion,
   wherein the cup bottom is configured to close an opening portion of the outer joint member on the side opposite to the shaft-fitting side, wherein, when the joint internal component moves to the side opposite to the shaft-fitting side in a normal state in which an impact generated in an abnormal state is not applied, the cup bottom is configured to regulate further movement of the joint internal component toward the side opposite to the shaft-fitting side by receiving the joint internal component, wherein, in a state in which the impact in the abnormal state is applied, the cup bottom that has received the joint internal component is cut by the impact at the cut portion which couples the cup bottom to the outer joint member, and the cup bottom is separated from the outer joint member, wherein the outer joint member is free of a seal plate, which is a separate member from the outer joint member, wherein a circumferential notch portion is provided at a radially outer portion of the cup bottom, by which the cut portion is formed, wherein the circumferential notch portion at the radially outer portion of the cup bottom is formed by a tapered surface and a cylindrical surface that faces radially inward, and wherein the tapered surface is inclined toward the shaft-fitting side as extending from a radially inner side to a radially outer side.

2. The constant velocity universal joint according to claim 1, wherein the outer joint member has track grooves finished by cold forging in a radially inner surface of the outer joint member.

3. The constant velocity universal joint according to claim 2, wherein the cut portion of the cup bottom is finished by machining.

4. The constant velocity universal joint according to claim 2, wherein the cut portion of the cup bottom is formed through adjustment of a heat treatment range.

5. The constant velocity universal joint according to claim 1, wherein the cut portion of the cup bottom is finished by machining.

6. The constant velocity universal joint according to claim 1, wherein the cut portion of the cup bottom is formed through adjustment of a heat treatment range.

7. The constant velocity universal joint according to claim 1,
wherein a steel pipe shaft is coupled to the outer joint member on the side opposite to the shaft-fitting side,
wherein the cut portion is formed on a radially outer side with respect to a maximum outer diameter of the joint internal component, and
wherein, at the time of application of the impact in the abnormal state, the cup bottom cut at the cut portion and the joint internal component are allowed to enter the steel pipe shaft.

8. A constant velocity universal joint comprising:
an outer joint member; and
a joint internal component received in the outer joint member and into which a shaft is fitted,
wherein the outer joint member has a cup bottom formed on a side opposite to a shaft-fitting side of the outer joint member at a cut portion, wherein the cup bottom is configured to close an opening portion of the outer joint member on the side opposite to the shaft-fitting side, wherein, when the joint internal component moves to the side opposite to the shaft-fitting side in a normal state in which an impact generated in an abnormal state is not applied, the cup bottom is configured to regulate further movement of the joint internal component toward the side opposite to the shaft-fitting side by receiving the joint internal component, wherein, in a state in which the impact in the abnormal state is applied, the cup bottom that has received the joint internal component is cut by the impact at the cut portion which couples the cup bottom to the outer joint member, and the cup bottom is separated from the outer joint member, wherein the outer joint member is free of a seal plate, which is a separate member from the outer joint member, wherein a circumferential notch portion is provided at a radially outer portion of the cup bottom, by which the cut portion is formed, wherein the circumferential notch portion is formed by a tapered surface and a cylindrical surface that faces radially inward, and wherein the tapered surface and the cylindrical surface form right-triangle sectional shape.

9. The constant velocity universal joint according to claim 8, wherein the outer joint member has track grooves finished by cold forging in a radially inner surface of the outer joint member.

10. The constant velocity universal joint according to claim 9, wherein the cut portion of the cup bottom is finished by machining.

11. The constant velocity universal joint according to claim 9, wherein the cut portion of the cup bottom is formed through adjustment of a heat treatment range.

12. The constant velocity universal joint according to claim 8, wherein the cut portion of the cup bottom is finished by machining.

13. The constant velocity universal joint according to claim 8, wherein the cut portion of the cup bottom is formed through adjustment of a heat treatment range.

14. The constant velocity universal joint according to claim 8,
wherein a steel pipe shaft is coupled to the outer joint member on the side opposite to the shaft-fitting side,
wherein the cut portion is formed on a radially outer side with respect to a maximum outer diameter of the joint internal component, and
wherein, at the time of application of the impact in the abnormal state, the cup bottom cut at the cut portion and the joint internal component are allowed to enter the steel pipe shaft.

* * * * *